(12) United States Patent
Flaks et al.

(10) Patent No.: US 9,484,026 B2
(45) Date of Patent: *Nov. 1, 2016

(54) SYSTEM AND METHOD FOR ANALYZING AND CLASSIFYING CALLS WITHOUT TRANSCRIPTION VIA KEYWORD SPOTTING

(71) Applicant: Marchex, Inc., Seattle, WA (US)

(72) Inventors: Jason Flaks, Redmond, WA (US); Ziad Ismail, Seattle, WA (US); Chris Kolbegger, Bainbridge Island, WA (US)

(73) Assignee: Marchex, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,221

(22) Filed: Jan. 7, 2016

(65) Prior Publication Data

US 2016/0118041 A1 Apr. 28, 2016

Related U.S. Application Data

(63) Continuation of application No. 14/045,118, filed on Oct. 3, 2013, now Pat. No. 9,263,038.

(51) Int. Cl.
| | | |
|---|---|---|
| *G10L 15/00* | (2013.01) | |
| *G10L 15/193* | (2013.01) | |
| *G10L 15/18* | (2013.01) | |
| *G10L 15/14* | (2006.01) | |
| *G10L 15/16* | (2006.01) | |
| *H04M 3/51* | (2006.01) | |
| *G10L 15/08* | (2006.01) | |

(52) U.S. Cl.
CPC .......... *G10L 15/193* (2013.01); *G10L 15/142* (2013.01); *G10L 15/16* (2013.01); *G10L 15/1822* (2013.01); *H04M 3/5175* (2013.01); *G10L 2015/088* (2013.01); *H04M 2201/18* (2013.01); *H04M 2201/405* (2013.01)

(58) Field of Classification Search
None
See application file for complete search history.

(56) References Cited

U.S. PATENT DOCUMENTS

| | | | | |
|---|---|---|---|---|
| 7,092,888 | B1 * | 8/2006 | McCarthy | G10L 15/063 379/88.01 |
| 7,437,291 | B1 * | 10/2008 | Stewart | G10L 15/193 704/10 |
| 7,624,014 | B2 * | 11/2009 | Stewart | G10L 15/193 704/210 |
| 8,370,127 | B2 * | 2/2013 | Jan | G10L 15/1822 379/88.02 |
| 8,515,736 | B1 * | 8/2013 | Duta | G10L 15/1822 704/9 |
| 8,527,279 | B2 * | 9/2013 | Singleton | G10L 15/08 704/255 |
| 9,224,396 | B2 * | 12/2015 | Lu | G06F 3/167 |
| 9,225,840 | B2 * | 12/2015 | Malatack | H04M 7/0036 |

(Continued)

*Primary Examiner* — Satwant Singh
(74) *Attorney, Agent, or Firm* — Perkins Coie LLP

(57) ABSTRACT

A facility and method for analyzing and classifying calls without transcription via keyword spotting is disclosed. The facility uses a group of calls having known outcomes to generate one or more domain- or entity-specific grammars containing keywords and related information that are indicative of particular outcome. The facility monitors telephone calls by determining the domain or entity associated with the call, loading the appropriate grammar or grammars associated with the determined domain or entity, and tracking keywords contained in the loaded grammar or grammars that are spoken during the monitored call, along with additional information. The facility performs a statistical analysis on the tracked keywords and additional information to determine a classification for the monitored telephone call.

33 Claims, 6 Drawing Sheets

(56) References Cited

U.S. PATENT DOCUMENTS

| | | | |
|---|---|---|---|
| 9,286,889 B2* | 3/2016 | Kanevsky | G10L 15/08 |
| 9,293,133 B2* | 3/2016 | Kanevsky | G10L 15/08 |
| 2003/0088403 A1* | 5/2003 | Chan | G10L 15/26 704/213 |
| 2008/0208583 A1* | 8/2008 | Jan | G10L 15/1822 704/257 |
| 2014/0195234 A1* | 7/2014 | Singleton | G10L 15/08 704/246 |
| 2014/0270114 A1* | 9/2014 | Kolbegger | G10L 25/93 379/88.08 |

* cited by examiner

| Call No. | Domain | Known Outcome |
|---|---|---|
| 1 | medical | conversion |
| 2 | financial services | conversion |
| 3 | medical | wrong number |
| 4 | medical | non-English |
| n | hospitality | complaint |

FIG. 5

| No. | Keyword | Mask | Domain | Indicated Outcome | Frequency | Position | Channel | Strength |
|---|---|---|---|---|---|---|---|---|
| 1 | "payment" | N/A | common | conversion | 2 | 50-75% | any | 0.85 |
| 2 | "card number . . ." | <card number> | common | conversion | 2 | 50-75% | client | 0.89 |
| 3 | "sorry" | N/A | common | wrong number | 1 | 0-25% | client | 0.7 |
| 4 | "no thanks" | N/A | common | conversion | 3 | 50-100% | client | -0.65 |
| 5 | "bonjour" | N/A | common | non-English | 1 | 0-15% | client | 0.95 |
| 6 | "do not call" | N/A | common | conversion | 2 | 0-100% | client | -0.97 |
| n | "cheapest" | N/A | common | upsale | 1 | 40-80% | client | -0.58 |

FIG. 6

| No. | Keyword | Mask | Domain | Indicated Outcome | Frequency | Position | Channel | Strength |
|---|---|---|---|---|---|---|---|---|
| 1 | "hepatitis" | <medical cond.> | medical | inquiry | 2 | 10-65% | client | 0.63 |
| 2 | "osteoporosis" | <medical cond.> | medical | conversion | 7 | 0-100% | client | 0.5 |
| 3 | "not covered" | N/A | medical | conversion | 3 | 25-90% | agent | -0.79 |
| n | "new orthotic" | N/A | medical | conversion | 2 | 0-75% | client | 0.52 |

FIG. 7

| No. | Keyword | Mask | Domain | Indicated Outcome | Frequency | Position | Channel | Strength |
|---|---|---|---|---|---|---|---|---|
| 1 | "IRA rollover" | N/A | financial svcs. | conversion | 4 | 0-100% | client | 0.25 |
| 2 | "confusing" | N/A | financial svcs. | conversion | 3 | 30-70% | client | -0.64 |
| n | "higher coverage" | N/A | financial svcs. | upsale | 9 | 60-90% | agent | 0.37 |

| No. | Keyword | Mask | Domain | Indicated Outcome | Frequency | Position | Channel | Strength |
|---|---|---|---|---|---|---|---|---|
| 1 | refinance | N/A | Bank ABC | conversion | 6 | 5-90% | client | 0.7 |
| 2 | prescription | N/A | Bank ABC | wrong number | 2 | 0-20% | client | 0.92 |
| 3 | cancel | N/A | Bank ABC | conversion | 3 | 10-62% | client | -0.89 |
| n | balance | N/A | Bank ABC | inquiry | 2 | 2-30% | client | 0.79 |

*FIG. 8*

SYSTEM AND METHOD FOR ANALYZING AND CLASSIFYING CALLS WITHOUT TRANSCRIPTION VIA KEYWORD SPOTTING

CROSS-REFERENCE TO RELATED APPLICATION(S)

This application is a continuation of U.S. patent application Ser. No. 14/045,118 entitled "SYSTEM AND METHOD FOR ANALYZING AND CLASSIFYING CALLS WITHOUT TRANSCRIPTION VIA KEYWORD SPOTTING" and filed on Oct. 3, 2013, the disclosure of which is incorporated herein by reference in its entirety.

BACKGROUND

Businesses in industries such as financial services, insurance, travel and hospitality, retail, cable and satellite television rely on voice contact with customers to answer client inquiries, make sales, and provide technical support. The increasing sophistication and use of smart phones and advanced mobile devices by customers has led to a more direct relationship in how advertisements drive phone calls. In particular, because customers are increasingly receiving advertisements on the same device used to make phone calls, the resulting ease of responding to advertisements by phone has facilitated closer relationships between customers and advertisers. For businesses across multiple domains or industries who send advertisements, every contact with a customer is an opportunity to make a lasting impression, to gather customer data, or to strengthen a customer's loyalty to the business. With regard to customer calls, it is desirable to know whether customers are receiving quality customer service that includes accurate information, adherence to professional communication standards, and the conveyance of a feeling of being valued by the business. It is also desirable for the business to understand what occurs during a phone call and how specific advertising campaigns affect the outcome of calls. This understanding can allow companies to better understand information relating to marketing campaigns, including how lead generation results in customer sales and retention.

One method used by businesses to track and analyze voice transactions is call recordation, with or without transcription. By listening to recorded customer calls (in their entirety or in samples), or by reviewing the transcripts of recorded customer calls, businesses hope to gain insight from conversations with real customers. However, the recording and transcription of calls incurs several problems and disadvantages, such as agent and/or caller objections and the need for expensive and specialized equipment. Recording and transcription of calls also raise legal and privacy concerns. For example, recording or transcribing information regarding an individual's medical health may violate certain laws, such as the Health Insurance Portability and Accountability Act (HIPAA). Similarly, federal and state privacy laws, as well as a general privacy concerns of the public, may arise when recording or transcribing certain personal information such as Social Security Numbers, credit card numbers, bank account numbers, passport numbers, physical street addresses, Protected Health Information (PHI), or other Personally Identifiable Information (PII). As a further example, recording or transcribing information may raise concerns regarding certain state and federal anti-discrimination laws with regard to national origin, race, color, religion, age, gender, pregnancy, sexual orientation, citizenship, familial status, disability status, veteran status, genetic information, or any additional number of protected classes under state or federal law. Moreover, as the volume of calls increases, the amount of storage and processing associated with maintaining a record of every call becomes increasingly prohibitive.

Another technique which businesses utilize to evaluate calls and boost advertising performance is known as call mining or keyword spotting. In call mining, businesses identify key words and phrases to be tracked in every call (e.g., "credit card," "appointment," "thank you," "sale") so as to determine which calls were converted into sales or appointments, and caller intent, needs and pain points. While the aim of call mining is to find successful outcomes and conversions, call mining is based on the words spoken in the call, acquired in either a manual or automated fashion. In general the calls must be recorded or transcribed, which as noted can be costly or prohibited for various reasons. In some cases, a transcript can be inaccurate because the source audio was of poor quality. Those skilled in the art will appreciated that the source audio may be real time, near real-time, transcribed, or a combination thereof. In other cases, a transcript can be inaccurate because large vocabulary speech recognition generally becomes less accurate as the size of the vocabulary grows larger. Therefore, if a relatively large vocabulary (e.g., the entire English dictionary) is needed, the resulting speech recognition may tend to be inaccurate. Moreover, at times, the vocabulary of the conversation can be foreign to a transcriber, and the transcribed results of low accuracy. Other schemes to analyze call outcomes such as live monitoring can also involve additional costs and drawbacks. As such, previous attempts at call mining have often proven to be inaccurate, unworkable, or prohibitively expensive.

BRIEF DESCRIPTION OF THE DRAWINGS

FIG. 5 is an exemplary table containing an embodiment of a common grammar.

FIG. 6 is an exemplary table containing an embodiment of a medical domain grammar.

FIG. 7 is an exemplary table containing an embodiment of a financial services domain grammar.

FIG. 8 is an exemplary table containing an embodiment of a grammar corresponding to a specific company ("Bank ABC").

DETAILED DESCRIPTION

Figure 1:
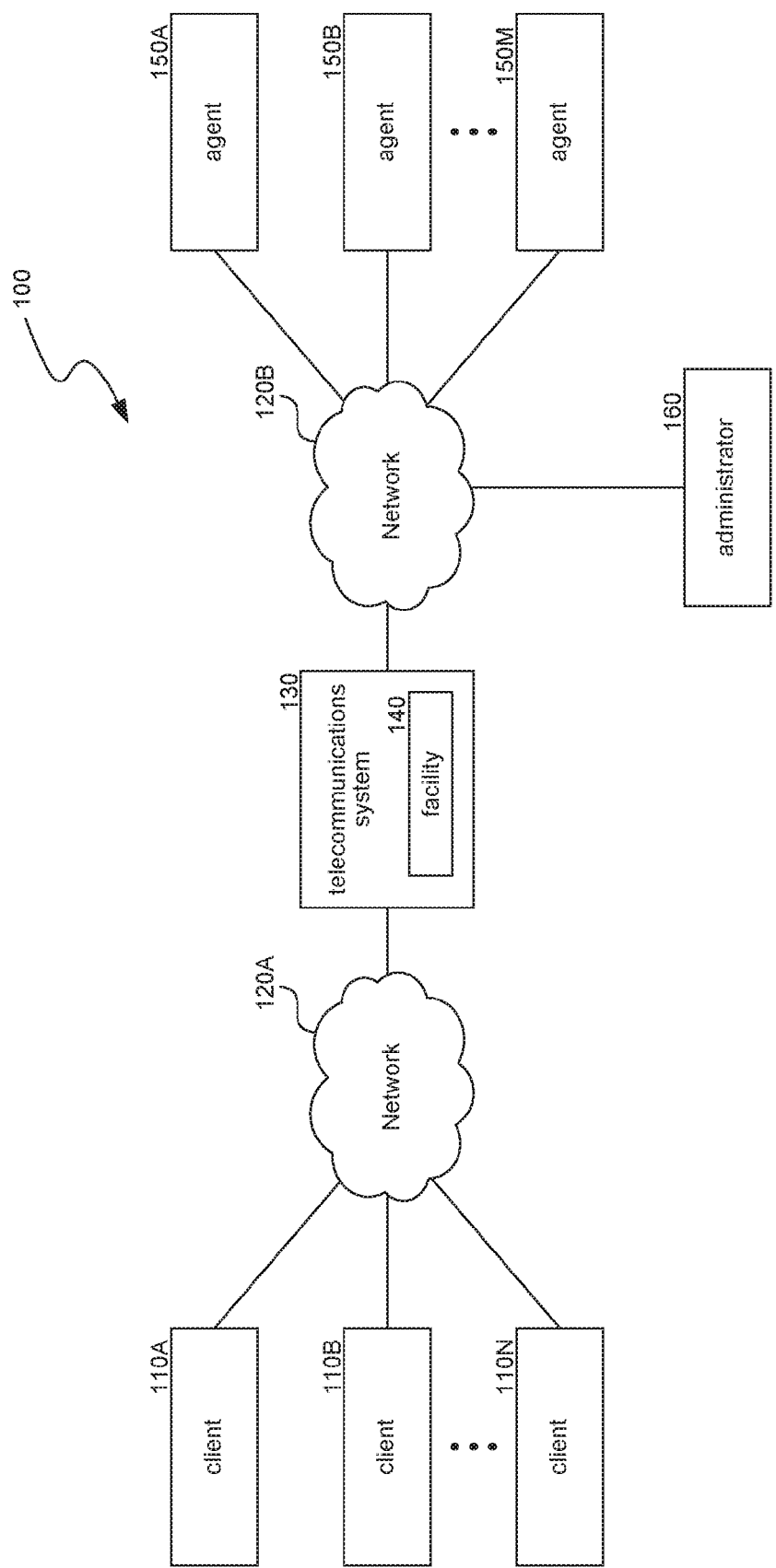
FIG. 1 is an exemplary block diagram illustrating an embodiment of a representative environment in which a system for analyzing and classifying calls without transcription via keyword spotting may operate.

A system and method that analyzes audio from a telephone call, without transcribing the entire call, and develops a characterization of the call is disclosed. The facility may use a hierarchical keyword vocabulary structure consisting of a top-level common keyword vocabulary that contains keywords that are universal to all calls, such as "wrong number" or "do not call back." Under the top-level common keyword vocabulary, the facility may use one or more domain-specific keyword vocabularies that each apply only to a respective domain, such as the medical domain or the financial services domain. Under each domain-specific keyword vocabulary, the facility may use one or more advertiser-specific keyword vocabularies that each apply to a particular advertiser in the domain. Under each advertiser-specific keyword vocabulary, the facility may use one or more product or service-specific keyword vocabularies that each apply only to a respective product or service offered by the advertiser.

The keyword vocabularies are constructed to recognize the differences between successful and unsuccessful outcomes across different domains. For example, the keywords that determine success or failure of an inbound call from a transportation company may differ vastly from the keywords that determine the success or failure of an inbound call to a hospital. Accordingly, the system first identifies, on a per-domain basis, a group of keywords (i.e., a keyword vocabulary) that indicate a particular outcome for a given domain. The system also calculates a strength indicator and other information that indicates the degree to which each keyword is indicative of the respective particular outcome. A call is then monitored to detect keywords contained in the call, and the system can take a series of identified keywords along with other information and make a determination of the call outcome.

The determination of the call outcome may be accomplished in a variety of ways. In some embodiments, the system determines the call outcome by using a probabilistic model such as a Bayesian model, hidden Markov model or a Gaussian mixture model. In some embodiments, the system may combine detected features using machine learning classification techniques such as logistic regression or neural networks. In some embodiments, the system sums the strength indicators of the detected keywords. If the sum of the strength indicators is greater than a predetermined threshold, the system indicates that the call likely resulted in a particular outcome. Conversely, if the sum of the strength indicators is less than the predetermined threshold, then the system indicates that the call likely did not result in a particular outcome. By using limited keyword vocabularies that are constructed on a per-domain basis, the system improves the likelihood of detecting a keyword in the call since keyword-detection algorithms are more accurate with a smaller vocabulary. Moreover, by seeking to detect only certain keywords in a call, the system effectively ignores all other content on the call, thereby minimizing privacy and security concerns that may be raised by the caller or the recipient. In some embodiments, additional features may be used to determine the classification of the call, including but not limited to the position of the keyword in the call, number of times the keyword is spoken during the call, total length of the call, or caller history.

In order to construct a keyword vocabulary that includes keywords that are indicative of a particular outcome, the system first receives a group of transcribed telephone calls having known outcomes. For calls known to have a particular outcome, the system analyzes the group of positive calls to identify keywords that occur with a relatively high frequency. In some embodiments, each identified positive keyword is further analyzed to generate additional information including a strength indicator that correlates the positive keyword to a likelihood of a particular outcome. Keywords with higher strength indicator values indicate a stronger likelihood of a particular outcome, while keywords having lower strength indicator values indicate a lower likelihood of a particular outcome. For example, a keyword that is highly correlated with a particular outcome may have a strength indicator of 0.9. The system performs a similar analysis for calls known to have a negative outcome (e.g., no conversion). For the group of negative calls, the system identifies keywords that occur with a relatively high frequency, and then analyzes the negative keywords to generate additional information including a strength indicator for each negative keyword. Keywords with higher strength indicator values indicate a stronger likelihood that a particular outcome did not occur, while keywords having lower strength indicators indicate a lower likelihood that a particular outcome did not occur. Because the negative outcome is not desired by a recipient, strength indicators of negative keywords have negative values (e.g., −0.8). To identify positive keywords and negative keywords, the system may employ various statistical methods, including regression analysis, machine learning, support vector machines, neural networks, and other statistical techniques.

In one example embodiment, the system may receive a group consisting of multiple transcribed telephone calls that relate to the travel industry, where the outcome of each call is known. To determine keywords and other information that tend to indicate whether a call is likely to result in new business in the travel industry, the system breaks the group of calls into one or more subgroups. A first subgroup consists of those calls that resulted in new business in the travel industry, and a second subgroup consists of those calls that did not result in new business in the travel industry. The system analyzes the first subgroup (i.e., successful new business calls) to identify positive keywords and other information that are highly correlated with a new business outcome in the travel industry. For each identified positive keyword in the first subgroup, the system assigns a positive strength indicator (e.g., +0.74) that captures the degree to which the identified positive keyword is indicative of new business in the travel industry. The system repeats the analysis for the second subgroup (i.e., unsuccessful calls that did not result in new business) to identify negative keywords and other information that are highly correlated with calls that did not result in new business in the travel industry. For each identified negative keyword in the second subgroup, the system assigns a negative strength indicator (e.g., −0.97) that captures the degree to which the identified negative keyword is indicative of a failure to generate new business in the travel industry. The system may perform a similar analysis of positive and negative keywords and other information for any number of additional potential call outcomes (e.g., wrong number, upsell, abandoned, miscellaneous, or complaint). Moreover, the system may maintain separate groups of keywords that correspond to a particular industry, domain, business, or entity, thereby enabling the keyword vocabularies to be more effectively customized.

In some embodiments, the system may receive one or more keyword vocabularies or one or more individual keywords from an external source, such as a system administrator, advertiser, or other third party. The system may use the received keyword vocabularies or individual keywords to identify relevant keywords spoken during call monitoring, either by using the received information in a standalone fashion or in combination with one or more keyword vocabularies that are generated by the system. By receiving external keywords or keyword vocabularies, the system allows a user to identify relevant keywords that are specific or time-sensitive in nature and therefore not necessarily identifiable by analyzing a group of calls having known outcomes. Detection of such keywords enables the system to determine any number of additional call classifications, such as an "advertising response" classification.

For example, an advertiser may provide the system with a keyword or keyword vocabulary corresponding to a new advertising campaign in order to determine calls that are placed in response to the advertising campaign. The advertiser may provide the system with the keyword "You're in strong hands," or the advertiser may provide the system with a keyword vocabulary containing multiple keywords, including "Don't leave your house without it," "Have a pop and a smile," "A diamond is for eternity," and "The ultimate driving apparatus." The system may load the received keyword or keyword vocabularies to enable identification of the respective keywords during call monitoring. Using this information, the system may determine and classify calls that are placed in response to advertising programs that include one or more of the above keywords. Further details regarding loading keyword vocabularies, monitoring telephone calls to identify spoken keywords, and determining call classifications are discussed in more detail below.

As discussed above, the system enables certain keywords in the keyword vocabulary to be masked in order to protect private or sensitive information. In some embodiments, the system allows keyword vocabularies to be edited in order to provide an indication that certain keywords are to be masked during subsequent call monitoring sessions. In other words, the keyword vocabularies may specify that the system is not to store certain keywords that are spoken while a call is being monitored, but should instead replace the spoken keyword with a generic indicator. For example, the system may determine that the word "hepatitis" tends to indicate an inquiry call in the medical industry. However, to protect a caller's personal information, the keyword vocabulary may specify that the system store only a <medical condition> generic keyword rather than storing the literal keyword "hepatitis" during call monitoring. The system may receive such masking instructions through a variety of means, including manual entry from an authorized user, or one or more lists (e.g., multiple pairs of keywords and corresponding keyword masks) provided to the system on a one-time or periodic basis.

When a call is identified for analysis, the system determines the correct set or sets of relevant keywords and other information (i.e., a keyword grammar) to load based on available information about the call. For example, in the case of outgoing calls, the system may retrieve from a database information regarding the domain to which the call recipient belongs. As another example, in the case of incoming calls, the system may use available information such as the identity of the telephone number at which the incoming call is received. Once the domain has been identified, the system loads the correct grammar or grammars having keywords and other information that are relevant to domain associated with the call. As the call progresses, the system monitors the call to identify keywords that match keywords in the loaded grammar or grammars. The system tracks each keyword spoken during the call and, at the conclusion of the call, determines a final classification or outcome for the call. In addition, the system may determine one or more intermediate call classifications before the call is concluded. The system may determine the classification or outcome through a variety of methods, including by loading and applying various statistical models, as disclosed herein. The determined classification or outcome may be used for a variety of analytical purposes, including but not limited to analyzing the effectiveness of advertising campaigns associated with certain telephone numbers, or analyzing the performance of individuals receiving telephone calls. One skilled in the art will appreciate that the determined classification may be used for any number of additional applications.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is an exemplary block diagram illustrating an embodiment of a representative environment in which a system for analyzing and classifying calls without transcription via keyword spotting may operate. In FIG. 1, the environment 100 includes a plurality of clients 110A-110N (e.g., "callers"), network portions 120A and 120B, a telecommunications system 130, a plurality of agents 150A-150M, and an administrator 160. The clients 110A-110N are coupled via the network portion 120A to the telecommunications system 130, which in turn is coupled through the network portion 120B to the plurality of agents 150A-150M and the administrator 160. As will be described in more detail below, the telecommunications system 130 includes a facility 140 for generating multiple grammars (including domain-specific grammars) and analyzing and classifying telephone calls.

The plurality of clients 110A-110N may include individual people, businesses, governmental agencies, or any other entities capable of initiating or receiving telephone calls. The plurality of agents 150A-150M similarly may include individual people, businesses, governmental agencies, or any other entities capable of initiating or receiving telephone calls. The administrator 160 may include any entity with administrative privileges capable of providing a set of telephone calls having known outcomes for the purpose of generating one or more grammars of keywords. The telecommunications system 130 may include any system and/or device, and/or any combination of devices/systems that connect or route telephone calls to and from clients 110A-110N and agents 150A-150M via network portions 120A and 120B. Additionally, the telecommunications system 130 may include any system and/or device, and/or any combination of devices/systems that enable the administrator to provide telephone calls having known outcomes to the facility 140 for the purpose of generating one or more grammars. The network portions 120A and 120B may include any public or private network, or any collection of distinct networks operating wholly or partially in conjunction to provide connectivity between the telecommunications system 130 and the clients 110A-110N, agents 150A-150M, and administrator 160, and may appear as one or more networks to the serviced parties, systems, and/or devices.

The network portions 120A and 120B may include, but are not limited to, a Voice over Internet Protocol (VoIP) network, a cellular telecommunications network, a public-switched telephone network (PSTN), any combination of these networks, or any other suitable network that can carry telecommunications. In one embodiment, communications over the network portions 120A and 120B may be achieved by a secure communications protocol, such as secure sockets layer (SSL), or transport layer security (TLS). In addition, communications can be achieved via one or more wireless networks, such as, but not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The telecommunications system 130 is able to connect or route telephone calls between clients 110A-110N and agents 150A-150M via the network portions 120A and 120B. The telecommunications system 130 implements a software, firmware, and/or hardware facility 140 for generating one or more grammars of keywords, and analyzing and classifying telephone calls without the use of transcription via keyword spotting. As described in more detail herein, the facility 140 applies a statistical analysis to a group of calls having known outcomes and generates one or more grammars that are indicative of a particular outcome. When actively monitoring a call, the facility 140 identifies the applicable domain (or industry) related to the call, loads the appropriate grammars (which may be hierarchically related) based on the identified domain, and analyzes frames of audio from the call to determine whether a party on the call speaks a keyword contained in the loaded grammar or grammars. While monitoring the call, the facility tracks spoken keywords and additional information such as keyword position, frequency, and the party who spoke the keyword, as described in more detail below.

After the monitored call ends, the facility analyzes the tracked information to determine a classification (or outcome) that characterizes the nature of the call. For example, the facility may classify a monitored call as a new customer, existing customer, inquiry, wrong number, upsell, abandoned, a Non-English conversation, a call regarding a non-product or service, a call for which the intent is unclear, a miscellaneous call, a call that can only be classified as strange or weird, a call regarding new business, a complaint call, a call requiring follow-up, a call resulting in sales (i.e., a "conversion"), a call regarding services that are not offered, or a call regarding hours, directions, or inventory. Those skilled in the art will recognize that any number of additional call classifications are possible. Additional details regarding call classifications may be found in commonly assigned U.S. patent application Ser. No. 13/842,769, filed Mar. 15, 2013 ("System and Method for Analyzing and Classifying Calls Without Transcription"), which is herein incorporated by reference in its entirety.

Figure 2:
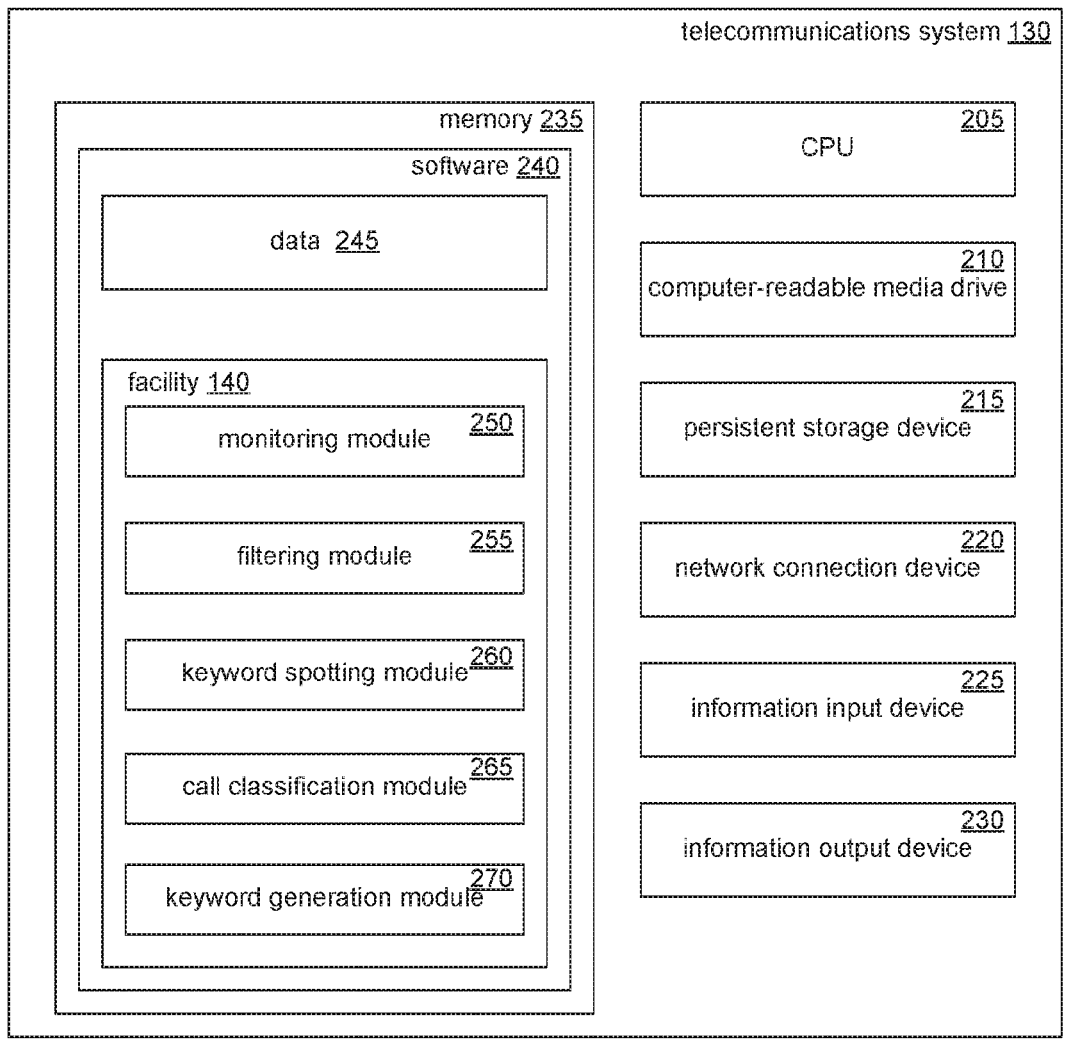
FIG. 2 is an exemplary block diagram illustrating an embodiment of the elements of the system of FIG. 1 in more detail.

FIG. 2 is an exemplary block diagram illustrating an embodiment of the elements of the system of FIG. 1 in more detail. As shown in FIG. 2, the telecommunication system 130 includes one or more central processing units (CPU) 205 for executing software 240, a computer-readable media drive 210 for reading information or installing software 240 from tangible computer-readable storage media (e.g., CD-ROM, a DVD, a USB flash drive and/or other tangible computer readable storage media), a network connection device 220 for connecting to a network, an information input device 225 (e.g., mouse, keyboard), an information output device 230 (e.g., display), and a memory 235.

The memory 235 stores software 240, which incorporates the facility 140 and data 245 used by the facility 140. The data 245 may be partially or wholly stored within the telecommunications system 130. In some embodiments, the data 245 may reside externally and may be communicatively coupled to the facility 140. The facility 140 performs certain methods or functions described herein, and may include components, subcomponents, or other logical entities that assist with or enable the performance of some or all of these methods or functions. In the embodiment of FIG. 2, the facility 140 is shown to include a monitoring module 250, a filtering module 255, a keyword spotting module 260, a call classification module 265, and a keyword generation module 270, each of which will be described in more detail below.

The keyword generation module 270 may comprise any combination of software agents and/or hardware components able to receive a group of calls having known outcomes and generate one or more hierarchically related grammars, including one or more domain-specific grammars. As described herein, the keyword generation module 270 may employ a variety of statistical means to generate keywords and additional information to facilitate the determination of the call classification. In addition, the keyword generation module may be adapted to receive one or more keywords or grammars from a system administrator, advertiser, or other third party.

The monitoring module 250 may comprise any combination of software agents and/or hardware components able to receive and process audio analysis inputs without transcribing, recording, or saving to disk. The monitoring module 250 streams audio of a telephone call. In some instances, the streaming audio is captured in real-time (live) or near real-time, as the telephone call is in progress. In other instances, the monitoring module 250 may receive pre-recorded audio files for analysis. Those skilled in the art will recognize that other forms of audio or acoustic data not otherwise detailed herein may be streamed and/or received by the monitoring module 250. In some embodiments, the monitoring module 250 may utilize or adapt a call processing technology such as Asterisk™.

The monitoring module 250 may also receive and process additional audio measurements. Examples include, but are not limited to, call metadata such as a time and/or length of a telephone call and identity of an advertiser, distribution, campaign, or circuit information. The monitoring module 250 may use this and other information to identify a domain associated with the call and may load one or more appropriate grammars applicable to the identified domain. For example, the monitoring module 250 may receive an identification of a phone number and determine the applicable domain of the phone number from a public or private database. In instances where the phone number or the applicable domain cannot be determined, the facility may load a common grammar and/or one or more additional default domain-specific grammars. Other additional audio analysis inputs include network latency measurements and media metadata such R-Factor and MOS scores from tools such as Empirix™. These inputs indicate whether the parties are able to hear each other on a line and can also signify a cause of quality issues (e.g., problems with a circuit).

The filtering module 255 may be any combination of software agents and/or hardware components able to apply at least one electronic filter or transformation to the audio of a telephone call so as to enhance detection of desired signals and minimize the effect of unwanted signals. In one embodiment, the filtering module 255 may apply a low-pass filter that eliminates high-frequency signals such as "pops," "hisses," and "shrieks." In a further or alternative embodiment, the filtering module may apply a high-pass filter to eliminate background noise in the audio signal. In some embodiments, the module may apply a Fourier transformation to facilitate examination of the audio in the frequency domain. Those skilled in the art will appreciate that one or more filters may be applied to "clean-up," transform, or enhance the audio stream so that the audio may be more effectively analyzed.

The keyword spotting module 260 may be any combination of software agents and/or hardware components that detect one or more keywords that are spoken during a monitored call. The keyword spotting module 260 is adapted to detect only those keywords that are present in one or more loaded grammars and therefore ignores all other spoken information during the monitored call. As a call is monitored, keyword spotting module 260 tracks each keyword that is spoken, along with additional related information. For example, in some embodiments, the telephone call consists of more than two parties, such as when the client is transferred to another agent or becomes a part of a teleconference with multiple agents. The keyword spotting module 260 would therefore account for and distinguish between the multiple channels and chronicle the keywords that are spoken by each party.

The call classification module 265 may be any combination of software agents and/or hardware components able to analyze the keywords and related information from the monitored call to determine an outcome or call classification. Call classification module 265 applies a formula or a set of rules to the keywords and related information from the monitored call to assess the likelihood that the monitored call results in a particular outcome. The call classification module 265 may determine a final call classification and/or an intermediate call classification, as described in more detail below. The call classification module 265 may employ a variety of different formulas or rules to arrive at a call classification. As one example, call classification module 265 may sum strength indicators for each monitored keyword to determine a call classification, as explained in more detail below. Those skilled in the art will appreciate that additional and alternative implementations are possible. Those skilled in the art will also appreciate that the call classification may determine the intermediate call classification and the final call classification by using common formulas or rules, or by using one or more different formulas or rules.

Those skilled in the art will appreciate that the telecommunications system 130 and facility 140 may be implemented on any computing system or device. Suitable computing systems or devices include personal computers, server computers, hand-held or laptop devices, multiprocessor systems, microprocessor-based systems, programmable client electronics, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

It will also be appreciated that the telecommunications system 130 includes multiple elements coupled to one another and each element is illustrated as being individual and distinct. However, in some embodiments, some or all of the components and functions represented by each of the elements can be combined in any convenient and/or known manner or divided over multiple components and/or processing units. For example, the elements of the telecommunications system 130 may be implemented on a single computer, multiple computers, and/or in a distributed fashion. As another example, elements 140, 160, and 245, or portions thereof, may be stored in memory, may reside externally and/or be transferred between memory 235 and a persistent storage device 215 (e.g., hard drive) for purposes of memory management, data integrity, and/or other purposes. Furthermore, the functions represented by the components can be implemented individually or in any combination thereof, in hardware, software, or a combination of hardware and software. Different and additional hardware modules and/or software agents may be included in the telecommunications system 130 without deviating from the spirit of the disclosure.

Figure 4:
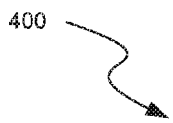
FIG. 4 is an exemplary table containing an embodiment of a group of calls having known outcomes that may be used to generate one or more hierarchically related grammars.

The facility 140 constructs one or more hierarchically related grammars containing multiple keywords and other information that is used to classify the outcome of a monitored call in a given domain. The facility constructs grammars by receiving a group of calls having known outcomes and performing a statistical analysis on the group of calls. FIG. 4 is an exemplary table containing an embodiment of a group of calls having known outcomes that may be used to generate one or more hierarchically related grammars. In Table 400, column 405 contains a call number that identifies each call that is to be analyzed to generate the grammar. Column 410 contains a domain identifier that identifies the applicable domain or industry for each respective call. For example, Table 400 illustrates that known outcome calls 1, 3, and 4 are related to the medical industry, known call 2 is related to the financial services industry, and known call n is related to the hospitality industry. Column 415 identifies the known outcome of each respective call. For example, known outcome calls 1 and 2 resulted in a conversion (e.g., a successful sale of a product or service), known outcome call 3 was a wrong number (e.g., the client or the agent misdialed a phone number and reached an unintended recipient), known outcome call 4 was spoken in a language other than English, and known outcome call n was a complaint call (e.g., a client who expressed dissatisfaction about a product or service). A person of ordinary skill in the relevant art will appreciate that Table 400 may include known outcome calls having a variety of additional outcomes that are not listed herein. A person of ordinary skill in the relevant art will further appreciate that the facility may be configured to classify calls that fall within or outside of any of a variety of additional languages, such as Spanish, Portuguese, or French.

The facility performs a statistical analysis on the calls having known outcomes in order to generate one or more grammars. The statistical analysis may consist of any number of known techniques, including for example, regression analysis, neural networks, and machine learning. Those skilled in the art will appreciate that any combination of these and/or other statistical techniques may be used to analyze the calls having known outcomes. Each resulting grammar contains one or more keywords and associated information that enable the facility to classify the outcome of a monitored phone call in real time or near real time. As described herein, the facility may generate multiple hierarchically related grammars, including grammars corresponding to a particular domain or a particular advertiser or special within a particular domain. In addition, the facility may generate common grammars that contain one or more keywords and associated information that apply to multiple domains. Accordingly, a common grammar recognizes the universal nature of certain keywords to indicate a particular outcome, regardless of the domain in which a call is made. For example, the facility may determine that keywords such as "no thanks" or "do not call back" tend to indicate an unsuccessful call outcome regardless of whether the keywords are detected in calls pertaining to the financial services industry, hospitality industry, transportation industry, or any other domain.

FIG. 5 is an exemplary table containing an embodiment of a common grammar. As explained above, the grammar may be configured to contain literal keywords and/or masked keywords. A literal keyword represents an exact match or a near match of actual words that are spoken during the phone call (e.g., "express shipping" or "credit card"). A masked keyword may contain a generic indicator that is intended to conceal confidential or sensitive information. For example, rather than indicating a keyword corresponding to actual digits of a credit card number, the grammar may instead generically indicate a generic <card number> keyword. When later monitoring a call the facility may detect an actual credit card number but store only a generic <card number> indication rather than the actual spoken credit card number. Similarly, the facility may detect an actual medical condition (such as "hepatitis") but may store only a generic <medical condition> keyword. The facility may use such keyword masks to protect a party's privacy and remain in compliance with applicable laws, such as the Health Insurance Portability and Accountability Act (HIPAA), or various additional federal and state anti-discrimination laws. In the embodiment of FIG. 5, Column 510 contains an identifier that may be any number or descriptor that serves to uniquely identify each literal keyword in the grammar (e.g., "card number 1234-4568-9012-3456"), and Column 513 may contain a masked keyword that corresponds to the corresponding literal keyword in Column 510. For example, as illustrated by row No. 2 of Table 505, the grammar may store the literal keyword "card number 1234-4568-9012-3456" in Column 510 and may store the corresponding masked keyword "<card number>" in Column 513. In cases where masking is not desirable for a literal keyword, the grammar may store an indication that no mask is required (e.g., by indicating a "N/A" or blank value in Column 513).

Column 515 contains the domain or industry to which each respective keyword belongs. Column 520 contains an indicated outcome for each respective keyword. The indicated outcome represents the likely call outcome (or call classification) determined by the statistical analysis with respect to each respective keyword. Column 525 contains the frequency with which the corresponding keyword must occur in a monitored call in order to be indicative of a particular outcome or call classification. Column 530 indicates the position in which the keyword must be detected in the monitored call in order to be indicative of a particular outcome or call classification. For example, as illustrated in Table 500, the keyword "credit card" is indicative of a conversion if "credit card" is spoken at least 50 percent into the monitored call but no greater than 75 percent into the monitored call. Although column 530 represents the keyword position as a percentage, those skilled in the art will appreciate that the position may be represented in any number of other formats. For example, the position may be specified as the number of minutes or seconds into the phone call (e.g., 90-300 seconds), or may be specified in terms of generic blocks such as beginning, middle, or end of call.

Column 535 contains a channel on which the keyword must be detected in order to be indicative of a particular outcome or channel classification. For example, the keyword "sorry" may be indicative of a particular outcome when spoken by a client but might not be indicative of any particular outcome when spoken by an agent. In some cases, a particular keyword may be indicative of the same outcome regardless of which party speaks the keyword. Column 540 includes a strength indicator that characterizes the degree to which the indicated keyword suggests the indicated outcome. The strength may be indicated on a scale from −1 to +1, with the likelihood that a keyword indicates a particular outcome increasing as the strength moves towards +1. Conversely, the likelihood that the keyword does not indicate a particular keyword increases as the number moves towards −1. Those skilled in the art will appreciate that the strength indicator may be represented using a variety of different scales or ranges, such as a 0-100% range.

Table 500 illustrates the keyword and related information that the statistical analysis determines relevant to determining the classification of monitored calls, regardless of the domain (i.e., a common grammar). As illustrated in Table 500, if any party (e.g., the agent or the client) speaks the keyword "payment" at least twice during the 50-75% time segment of the call, the system stores information that indicates that the keyword "payment" was spoken during the monitored call, and the system notes that these circumstances would be result in a 0.85 strength indication of a conversion. Similarly, if a client speaks a series of digits that correspond to a credit card number at least twice during the 50-75% time segment of the call, the system will store information indicating only that a generic <card number> was spoken (i.e., the system will not store the actual credit card number that was spoken), and the system notes that these circumstances would be result in a 0.89 strength indication of a conversion. If a client speaks the keyword "sorry" at least once during the 0-25% time segment of the call, these circumstances would be result in a 0.70 strength indication of a wrong number. If a client speaks the keyword "no thanks" at least three times during the 50-100% time segment of the call, these circumstances would be result in a −0.65 strength indication of a conversion (i.e., these circumstances tend to indicate that no conversion occurred).

FIG. 6 is an exemplary table containing an embodiment of a medical domain grammar. The medical grammar of Table 600 contains columns that correspond to the columns described above with reference to FIG. 5. For example, if a client speaks the keyword "hepatitis" at least twice during the 10-65% time segment of the call, the system will store information indicating only that a generic <medical condition> was spoken (i.e., the system will not store that the actual word "hepatitis" was spoken), and the system notes that these circumstances would result in a 0.63 strength indication of an inquiry. Similarly, if a client speaks the keyword "osteoporosis" at least seven times at any time during the call, the system will store information indicating only that a generic <medical condition> was spoken (i.e., the system will not store that the actual word "osteoporosis" was spoken), and the system notes that these circumstances would result in a 0.5 strength indication of a conversion.

FIG. 7 is an exemplary table containing an embodiment of a financial services domain grammar. The financial services grammar of Table 700 contains columns that correspond to the columns described above with reference to FIG. 5. For example, if a client speaks the keyword "IRA rollover" at least four times at any time during the call, these circumstances would be result in a +0.25 strength indication of a conversion. If the client speaks the keyword "confusing" at least three times at any time during the monitored call, these circumstances would result in a −0.64 strength indication of a conversion (i.e., indicating that a conversion is not likely). Although the embodiments of FIGS. 6 and 7 illustrate grammars that are domain-specific, the facility is capable of alternative embodiments that combine keywords from multiple domains into a single grammar.

FIG. 8 is an exemplary table containing an embodiment of a grammar corresponding to a specific company ("Bank ABC"). The Bank ABC grammar of Table 800 contains columns that correspond to the columns described above with reference to FIG. 5. For example, if a client speaks the keyword "refinance" at least six times during the 5-90% time segment of the call, these circumstances would result in a +0.70 strength indication of a conversion. If the client speaks the keyword "prescription" at least twice during the 0-20% time segment of the monitored call, these circumstances would result in a +0.92 strength indication of a wrong number. If the client speaks the keyword "cancel" at least three times during the 10-62% time segment of the call, these circumstances would result in a −0.89 strength indication of a conversion (i.e., indicating that a conversion is not likely). If the client speaks the word "balance" at least twice during the 2-30% time segment of the call, these circumstances would result in a +0.79 strength indication of an inquiry. Although the embodiments of FIGS. 6-8 illustrate grammars that are domain-specific, the facility is capable of alternative embodiments that combine keywords from multiple domains into a single grammar.

During call monitoring, the facility tracks spoken keywords and related information as set forth in the applicable loaded grammar or grammars, as described above. The facility may use the tracked keywords to make one or more intermediate call classifications, and/or a final classification. At any time while a call is being monitored, the facility may use tracked information to determine one or more intermediate call classifications. An intermediate call classification may occur any number of times during a monitored call based on a variety of factors or conditions. For example, an intermediate call classification may occur at one or more predetermined intervals, at random, or when requested by an agent or supervisor. Because an intermediate call classification may occur while a call is in progress, the facility enables real-time action to be taken with respect to the client or the agent based on the manner in which the call is progressing. For example, if the keywords "cancel" and "account" are tracked before a call is terminated, an indeterminate call classification may result in an "intervention" classification that alerts a supervisor to a potential problem with the call in progress. The supervisor may then take action by, for example, taking over the call from the agent. As another example, the supervisor may intervene by authorizing one or more financial incentives to increase the odds of making a sale to the client (i.e., a conversion) and/or prevent the client from canceling an account. Additional details regarding call intervention may be found in the aforementioned commonly assigned U.S. patent application Ser. No. 13/842,769. When the call being monitored is terminated, the facility then analyzes the tracked information to make a final determination of the call classification. Those skilled in the art will appreciate that the facility may make one or more intermediate classifications before making a final classification, or may proceed to the final classification without first making one or more intermediate classifications.

The intermediate determination and/or final determination may be accomplished using a wide array of formulas or methodologies. In one such embodiment, the facility sums the strength indicators for each keyword that was spoken on a per-outcome basis, and then selects the potential outcome having the largest sum. For example, the facility may track three keywords that are indicative of an inquiry call, the three keywords having strength indicators of +0.53, +0.67, and −0.32, respectively, for a total inquiry strength indicator of +0.88. During the same call, the facility may track two keywords that are indicative of a conversion, the two keywords having strength indicators of +0.93 and +0.68, respectively, for a total conversion strength indicator of +1.61. The facility would then classify the monitored call as a conversion because the total conversion strength indicator (+1.61) represents a higher value than the total inquiry strength indicator (+0.88). The facility may additionally enforce a threshold in order to determine an intermediate or final call classification. That is, the facility may only classify the call as a particular outcome if the highest per-outcome strength indicator is greater than a predetermined threshold. If the highest per-outcome strength indicator is less than the predetermined threshold, the facility may decline to assign an intermediate or final classification (and may indicate that a classification could not be determined). In some embodiments, the facility may return a likelihood for a given classification, along with a confidence interval.

In another embodiment, the facility may determine the intermediate and/or final call classification using machine learning classification techniques such as logistic regression or neural networks. The facility may use the output from the keyword spotting module to create a vector containing keyword features such as the presence of a keyword, the number of occurrences of a keyword, or the position of a keyword. The facility may then pass the vector to one or more predictive algorithms for each classification, returning a likelihood value. The one or more predictive algorithms could be a linear or logistic regression, a neural network, or a Bayesian computation model. The facility may then choose the highest probability classification and return a corresponding indication, such as a Boolean indicator or a likelihood value with or without confidence intervals.

Figure 3:
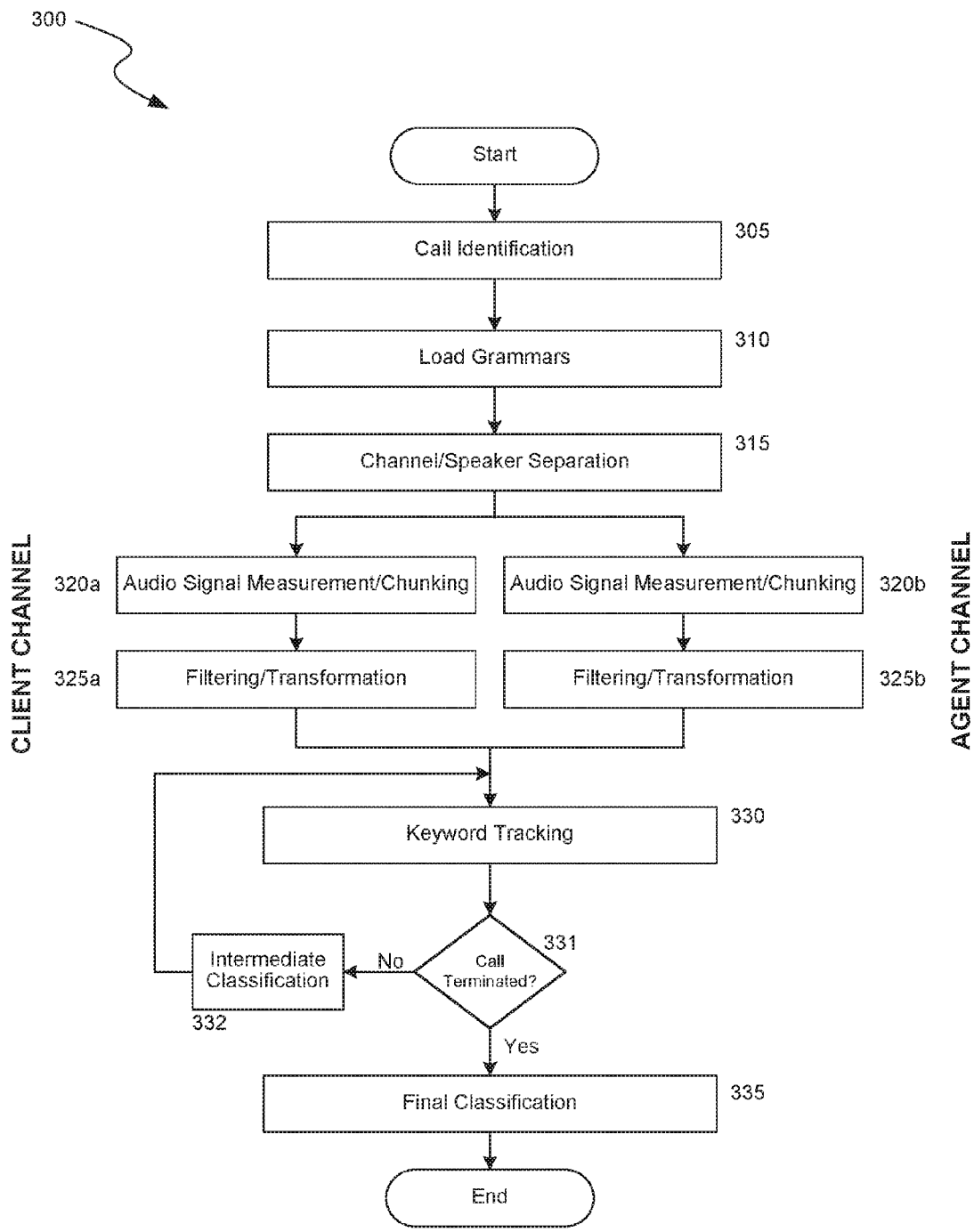
FIG. 3 is an exemplary flow diagram illustrating an embodiment of a process implemented by the system of FIG. 1 in connection with analyzing and classifying calls without transcription via keyword spotting.

FIG. 3 is an exemplary flow diagram illustrating an embodiment of a process implemented by the system of FIG. 1 in connection with analyzing and classifying calls without transcription via keyword spotting. Those skilled in the art will appreciate that the depicted flow diagram may be altered in a variety of ways. For example, the order of the steps may be rearranged, steps may be performed in parallel, steps may be omitted, or other steps may be included.

The process 300 begins at a block 305, where the facility identifies one or more telephone calls to analyze as well as any corresponding parameters or metadata of the telephone call(s). Example parameters and metadata include, but are not limited to, the telephone number on the client-side 110 and/or on the agent-side 150, client ID, agent ID, date and time of call, call duration, number of parties on the line, etc. Because the call can originate from either a client or an agent, the facility 140 may use caller identification technology to identify the telephone numbers of the parties to the telephone call. The facility 140 may further use, for example, call routing information to determine an account identifier, a forwarding telephone number, or other identifier.

At a block 310, the facility loads one or more grammars based on the identified call. The facility uses the obtained parameters or metadata of the telephone calls to determine the domain or industry associated with the call. In response, the facility may load one or more grammars that pertain to the identified applicable domain. In addition, as explained previously herein, the facility may load one or more additional grammars, such as a common grammar that applies to all industries, and/or additional grammars in a grammar hierarchy, such as grammars that pertain to a particular advertiser within the identified domain or a particular product or service offered by an advertiser within the identified domain.

At a block 315, the facility receives audio of a telephone call, without transcribing the call. In some embodiments, the facility monitors the audio signals of a live call and analyzes the audio of the call as the call is occurring. Alternatively, the facility may receive pre-recorded audio signals of calls and analyze the pre-recorded data. The facility, in some instances, may first determine a mode of operation (e.g., monitor, retrieving recorded files for audio analysis), call out to a monitoring service to set-up the audio streaming, point a modified monitor application to named pipes, and forward the streamed audio to the monitor service for analysis. The facility separates the telephone call into two channels. A first channel corresponds to the client side 110 of the telephone call and a second channel corresponds to an agent side 150 of the telephone call. By separating the telephone call into two channels, the facility is able to identify which party speaks each detected keyword and is therefore better able to effectively determine the outcome of the call.

At blocks 320a-320b, the audio signal for each respective channel (i.e., client channel 320a and agent channel 320b) is measured and broken into a plurality of data segments. The channel measurements may include, but are not limited to, network latency, R-Factor, MOS scores, excessive delay, echoing, and momentary audio interruptions. The signal is broken into segments to allow CPU 205 to process the audio data more quickly and efficiently.

At blocks 325a-325b, the facility applies filtering and transformation techniques to the audio in real time or near real time for each respective channel (i.e., client channel 325a and agent channel 325b). In one embodiment, the facility in real time or near real time applies a signal filter to eliminate unwanted signals in the audio signal. Filtering options include, but are not limited to a high-pass, low-pass, notch, or band-pass filter. For example, a high-pass filter may be applied to remove any low frequency rumbles, unwanted vocal plosives or DC offsets. Those skilled in the art will recognize that high-pass filters may also be applied for other reasons, such as reducing the influence of background noise in order to improve speech recognition and the robustness of a connected-words recognizer. A low-pass filter may be applied in an effort to eliminate or minimize offending treble shrieks or general ambient background noise. A band-stop filter may be applied to remove recurring or cyclical noise such as a hum of 50 or 60 Hertz. In addition, the facility may used advanced signal processing algorithms such as, but not limited to, the Fast Fourier Transform (FFT), to examine a representation of the audio in a basis other than the time domain.

At block 330, the facility monitors a phone call to detect when a party speaks one or more literal keywords that are present in the one or more loaded grammars. As described in more detail above, the system may store (or "track") a detected literal keyword or may instead store a corresponding generic keyword when the loaded grammar indicates that such a substitution is desirable. By masking certain keywords according to information contained in the loaded grammar or grammars, the system greatly enhances protection of sensitive information (e.g., Social Security Numbers, Personally Identifiable Information, Protected Health Information, credit card numbers, and other types of sensitive information, as described above). In addition to tracking each keyword that is spoken, the facility tracks additional information, such as the party (i.e., the agent or caller/client) who spoke the keyword and the relative position at which the keyword was spoken during the monitored call.

At blocks 331-332, the facility optionally determines an intermediate call classification one or more times while the monitored call is in progress (i.e., before the call is terminated). At block 331, the facility determines whether the monitored call has been terminated. If the facility determines that the call has not been terminated, the facility proceeds to block 332 and performs an intermediate call classification using the keywords that have been tracked during the call in progress. As described above, the facility may take one or more actions based on the determined intermediate call classification (such as indicating that a call intervention is warranted). After performing the intermediate classification, the facility returns to block 330 to continue tracking keywords being spoken during the call in progress. As explained above, the facility may repeat the intermediate classification any number of times before the monitored call is terminated.

After the call has been terminated, the facility determines the final call classification at a block 335 using the tracked keywords and additional information. As described above, the facility may use a variety of statistical means to arrive at a call classification, including summing strength indicators for each indicated potential call classification and choosing the call classification having the largest strength indicator sum. Those skilled in the art will appreciate that the final classification may be computed in real-time or at a later time. Those skilled in the art will further appreciate that, if the final classification is made at a later time, the computation may involve storing only certain information (such as the feature information detected by the keyword spotting module) without storing a transcription of the entire call.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A computing system for analyzing a telephone call to assess a classification of the telephone call, the computer system comprising:
  a memory for storing programmed instructions; and
  a processor configured to execute the programmed instructions to perform operations including:

identifying a telephone call to monitor;

loading one or more grammars, wherein the one or more grammars contain one or more keywords and associated parameters that are correlated with a likelihood of a particular classification for the identified telephone call;

receiving an audio signal of the identified telephone call, wherein the audio signal of the telephone call is not transcribed in its entirety;

using the one or more loaded grammars to monitor the received audio signal and identify one or more keywords and associated parameters that are present in the received audio signal;

loading a computation model to determine the classification of the identified telephone call;

using the loaded computation model to determine the classification of the identified telephone call based at least on the identified keywords and associated parameters; and outputting, by the computing system, the determined classification.

2. The computing system of claim 1, wherein determining the classification by the loaded computation model comprises:

retrieving a strength indicator for each identified keyword that is present in the received audio signal, wherein the strength indicator correlates the identified keyword to a likelihood of a particular outcome;

calculating, for each particular outcome, an aggregate strength indicator value for the identified keywords that relate to the particular outcome;

identifying the particular outcome having the highest aggregate strength indicator value; and wherein outputting the determined classification comprises providing, by the computing system, an indication that the telephone call resulted in the identified particular outcome.

3. The computing system of claim 2, wherein the indication that the telephone call resulted in the identified particular outcome is provided only if the identified particular outcome is greater than a predetermined threshold value.

4. The computing system of claim 1, wherein at least two of the loaded grammars are hierarchically related to each other.

5. The computing system of claim 1, wherein the associated parameters are selected from the group consisting of keyword frequency, keyword position, and keyword channel.

6. The computing system of claim 1, wherein at least one of the keywords is a masked keyword that contains a generic indication of protected information.

7. The computing system of claim 6, wherein the protected information is selected from the group consisting of Social Security Numbers, credit card numbers, bank account numbers, passport numbers, physical street addresses, Protected Health Information (PHI), and Personally Identifiable Information (PII).

8. The computing system of claim 1, wherein the computation model is based on a Bayesian model, hidden Markov model, Gaussian mixture model, neural network, machine learning classification technique, or logistic regression.

9. The computing system of claim 1, wherein the classification of the identified telephone call is selected from the group consisting of new customer, existing customer, inquiry, wrong number, upsell, abandoned, Non-English conversation, non-product or service, unclear intent, miscellaneous, strange/weird, new business, complaint, follow-up needed, and sale/conversion.

10. The computing system of claim 1, wherein the classification of the identified telephone call is determined before the call is terminated.

11. The computing system of claim 1, wherein the classification of the identified telephone call is determined after the call is terminated.

12. A method in a computer system for analyzing a telephone call to assess a classification of the telephone call, the method comprising:

identifying, by the computer system, a telephone call to monitor;

loading, by the computer system, one or more grammars, wherein the one or more grammars contain one or more keywords and associated parameters that are correlated with a likelihood of a particular classification for the identified telephone call;

receiving, by the computer system, an audio signal of the identified telephone call, wherein the audio signal of the telephone call is not transcribed in its entirety;

using, by the computer system, the one or more loaded grammars to monitor the received audio signal and identify one or more keywords and associated parameters that are present in the received audio signal;

loading, by the computer system, a computation model to determine the classification of the identified telephone call;

using, by the computer system, the loaded computation model to determine the classification of the identified telephone call based at least on the identified keywords and associated parameters; and outputting, by the computer system, the determined classification.

13. The method of claim 12, wherein determining the classification by the loaded computation model comprises:

retrieving a strength indicator for each identified keyword that is present in the received audio signal, wherein the strength indicator correlates the identified keyword to a likelihood of a particular outcome;

calculating, for each particular outcome, an aggregate strength indicator value for the identified keywords that relate to the particular outcome;

identifying the particular outcome having the highest aggregate strength indicator value; and wherein outputting the determined classification comprises providing, by the computer system, an indication that the telephone call resulted in the identified particular outcome.

14. The method of claim 13, wherein the indication that the telephone call resulted in the identified particular outcome is provided only if the identified particular outcome is greater than a predetermined threshold value.

15. The method of claim 12, wherein at least two of the loaded grammars are hierarchically related to each other.

16. The method of claim 12, wherein the associated parameters are selected from the group consisting of keyword frequency, keyword position, and keyword channel.

17. The method of claim 12, wherein at least one of the keywords is a masked keyword that contains a generic indication of protected information.

18. The method of claim 17, wherein the protected information is selected from the group consisting of Social Security Numbers, credit card numbers, bank account numbers, passport numbers, physical street addresses, Protected Health Information (PHI), and Personally Identifiable Information (PII).

19. The method of claim 12, wherein the computation model is based on a Bayesian model, hidden Markov model, Gaussian mixture model, neural network, machine learning classification technique, or logistic regression.

20. The method of claim 12, wherein the classification of the identified telephone call is selected from the group consisting of new customer, existing customer, inquiry, wrong number, upsell, abandoned, Non-English conversation, non-product or service, unclear intent, miscellaneous, strange/weird, new business, complaint, follow-up needed, and sale/conversion.

21. The method of claim 12, wherein the classification of the identified telephone call is determined before the call is terminated.

22. The method of claim 12, wherein the classification of the identified telephone call is determined after the call is terminated.

23. A non-transitory computer readable storage medium with instructions stored thereon that, when executed by a computing system, cause the computing system to perform a method for analyzing a telephone call to assess a classification of the telephone call, the method comprising:
    identifying, by the computing system, a telephone call to monitor;
    loading, by the computing system, one or more grammars, wherein the one or more grammars contain one or more keywords and associated parameters that are correlated with a likelihood of a particular classification for the identified telephone call;
    receiving, by the computing system, an audio signal of the identified telephone call, wherein the audio signal of the telephone call is not transcribed in its entirety;
    using, by the computing system, the one or more loaded grammars to monitor the received audio signal and identify one or more keywords and associated parameters that are present in the received audio signal;
    loading, by the computing system, a computation model to determine the classification of the identified telephone call;
    using, by the computing system, the loaded computation model to determine the classification of the identified telephone call based at least on the identified keywords and associated parameters; and
    outputting, by the computing system, the determined classification.

24. The computer readable storage medium of claim 23, wherein determining the classification by the loaded computation model comprises:
    retrieving a strength indicator for each identified keyword that is present in the received audio signal, wherein the strength indicator correlates the identified keyword to a likelihood of a particular outcome;
    calculating, for each particular outcome, an aggregate strength indicator value for the identified keywords that relate to the particular outcome;
    identifying the particular outcome having the highest aggregate strength indicator value; and
    wherein outputting the determined classification comprises providing, by the computing system, an indication that the telephone call resulted in the determined particular outcome.

25. The computer readable storage medium of claim 24, wherein the indication that the telephone call resulted in the identified particular outcome is provided only if the identified particular outcome is greater than a predetermined threshold value.

26. The computer readable storage medium of claim 23, wherein at least two of the loaded grammars are hierarchically related to each other.

27. The computer readable storage medium of claim 23, wherein the associated parameters are selected from the group consisting of keyword frequency, keyword position, and keyword channel.

28. The computer readable storage medium of claim 23, wherein at least one of the keywords is a masked keyword that contains a generic indication of protected information.

29. The computer readable storage medium of claim 28, wherein the protected information is selected from the group consisting of Social Security Numbers, credit card numbers, bank account numbers, passport numbers, physical street addresses, Protected Health Information (PHI), and Personally Identifiable Information (PII).

30. The computer readable storage medium of claim 23, wherein the computation model is based on a Bayesian model, hidden Markov model, Gaussian mixture model, neural network, machine learning classification technique, or logistic regression.

31. The computer readable storage medium of claim 23, wherein the classification of the identified telephone call is selected from the group consisting of new customer, existing customer, inquiry, wrong number, upsell, abandoned, Non-English conversation, non-product or service, unclear intent, miscellaneous, strange/weird, new business, complaint, follow-up needed, and sale/conversion.

32. The computer readable storage medium of claim 23, wherein the classification of the identified telephone call is determined before the call is terminated.

33. The computer readable storage medium of claim 23, wherein the classification of the identified telephone call is determined after the call is terminated.

* * * * *